Jan. 6, 1931.  R. E. SWAIN  1,788,037
METHOD OF DELIVERING GLASS
Filed Sept. 14, 1928
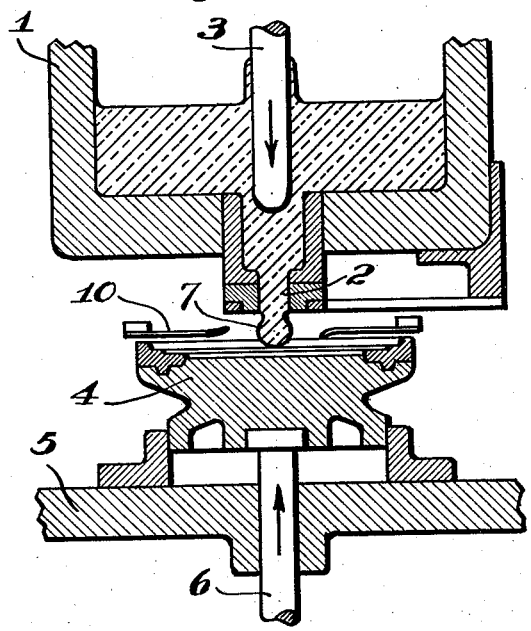
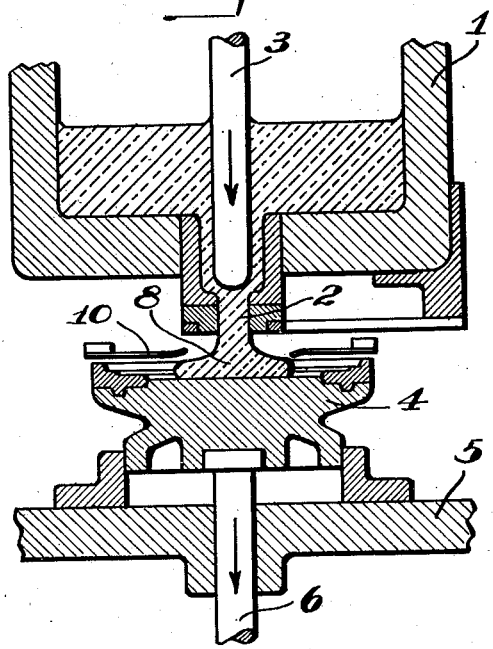
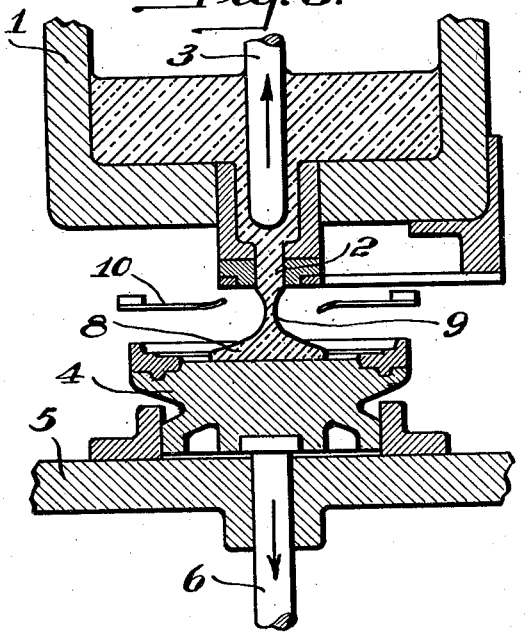
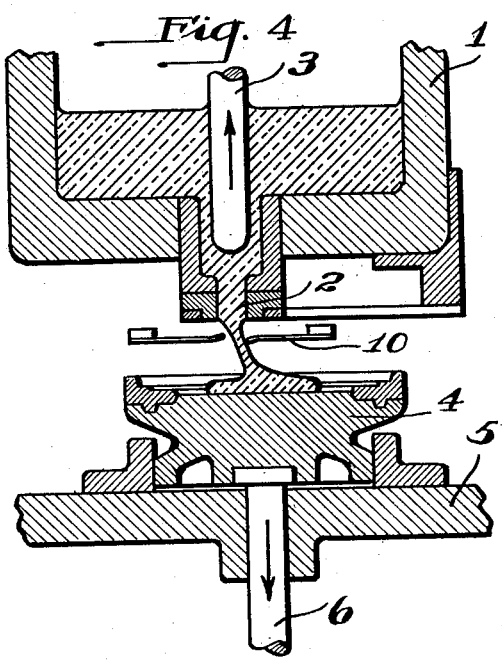
WITNESS
A B Wallace.
INVENTOR
Roy E. Swain,
by Brown & Critchlow,
his attorneys.

Patented Jan. 6, 1931

1,788,037

UNITED STATES PATENT OFFICE

ROY E. SWAIN, OF CHARLEROI, PENNSYLVANIA

METHOD OF DELIVERING GLASS

Application filed September 14, 1928. Serial No. 305,952.

The invention relates to the delivery of molten glass from containers thereof, as for example, from forehearths of glass melting tanks.

The introduction of automatic and semi-automatic glass forming machines has been accompanied, or followed, by various mechanical means for delivering glass to the machines, among which are flow feeders of both the continuous and pulsating types, as well as gob feeders. For the manufacture of some articles of glassware, particularly lighter weight articles made in large quantities, gob feeders are quite satisfactory. However, glass must be relatively viscous to be discharged from forehearths or other containers in properly formed gobs, and it is difficult, and in some cases impossible from a practical standpoint to cause viscous glass to conform to the sharp corners and other configurations which characterize molds of some glass articles. Furthermore, there is a limitation on the amount of glass that may be fed in formed gobs, which makes it impractical to so feed glass for the manufacture of heavier articles. In addition to these limitations upon gob feeding, forming machines which are so fed must be operated relatively rapidly, which makes it necessary to provide each machine with a relatively large number of molds which in some cases are quite expensive. Accordingly, small orders of glassware cannot be economically made on gob fed machines because of the initial cost of equipping them with the required number of molds.

When glass is dicharged from containers by a flow, as distinguished from a gob feed, the glass may be as hot and fluid as necessary to cause it to properly conform to any mold configuration; there is no limit to the amount of glass which may be delivered in a single operation; and it is not essential that the forming machines be operated rapidly. Accordingly, flow feeders have, for some classes and forms of ware, inherent advantages over gob feeders. However, as practiced prior to my invention, flow feeding has the disadvantage that molten glass has flowed so irregularly upon or into molds or other receptacles that in the charges of glass, laps and seams have been formed which can not be obliterated in the finished products. At times air bubbles have been entrapped in the charges. Specifically, the glass has flown from containers in irregular circuitous streams, portions of it lapping or folding upon glass resting on the receptacles and forming a visible seam by reason of non-uniform distribution, or cooling, or both.

The object of this invention is to provide a simple and effective method of so flowing molten glass from a container into a mold or an equivalent receptacle that the charges of glass will have no laps and resulting seams, and will contain no entrapped air bubbles.

The invention is predicated upon my discovery that by maintaining a glass receiving mold relatively close to the discharge orifice of a container, molten glass may be caused to flow in a substantially straight line upon the central portion of the mold, and to uniformly spread laterally from the central to or towards the marginal portion of the mold without lapping.

In the practice of the invention, glass is flown in a lateral unconfined stream from a container upon the central portion of the bottom of a mold which intercepts the stream and supports its lower end. The bottom of the mold and the discharge orifice of the container are maintained at such relative proximity that glass flows in a substantially straight line upon and spreads laterally from the central portion of the mold. At about the time sufficient glass has been thus charged into a mold, the distance between the mold and the orifice of the container is increased to neck, or in other words, diminish the cross sectional area of the stream of glass prior to severing it. By thus increasing the distance between the orifice and mold to neck a stream of glass, the severing shears pass through a relatively small diameter stream, and accordingly only small shears marks are formed on the severed ends of the glass. In thus severing the necked stream of glass, the lower shear blade throws the tail of the stream upon one side of the charge with the result that the shear mark is obliterated in pressing or otherwise forming the charge. To facilitate the throwing of a tail of glass upon the outer portion of a charge, the mold may be moved laterally with respect to the discharge orifice of the container simultaneously with, or just prior to, the operation of the shears. While either the glass container or the mold may be moved to effect the necking of a flowing stream of glass, it is preferred to move the mold.

The maximum distance at which a mold or equivalent receptacle may be spaced from the orifice of a glass receptacle depends upon the character of the glass, its fluidity which varies with its temperature, and the diameter of the discharge orifice. In working with various glasses at different temperatures discharged from different sized orifices, I have found that the distance between an orifice and a mold should not be greater than about three times the diameter of the orifice. The mold should not be so close to the orifice that the mold and the glass delivered to it substantially retard the flow of the stream, and this distance should not be so great that the stream of glass flows in a circuitous or buckled fashion. By way of example, and not of limitation, with a flow of quite fluid ordinary lime glass through an orifice 1$\frac{1}{8}$ inches in diameter onto the bottom of a flat mold in charges of thirteen ounces, I have found that the best results are obtained by maintaining the mold at a distance of about 2½ inches below the orifice. In this example, the stream may be sufficiently necked by lowering the mold to about 3½ inches from the orifice just prior to severing the stream.

In the accompanying drawings there are illustrated several stages in the cycle of charging a mold according to this invention, the four figures being vertical sectional views through the center of a shallow mold and through the discharge orifice of the forehearth of a glass melting tank.

Referring first to Fig. 1, there is illustrated a forehearth 1 having its bottom provided with a discharge orifice 2 through which flow of glass is regulated and controlled by a reciprocable needle or plunger 3. Below the orifice, and centrally disposed with relation to it, there is a shallow press mold 4, which, as diagrammatically illustrated, may be mounted upon a rotatable turret 5 of a glass forming machine. The mold is adapted to be moved vertically by a rod 6 for properly positioning it with relation to orifice 2. In this figure, a stream of glass 7 is indicated as beginning to flow from the forehearth, the mold being in its upper position to place it in relatively close proximity to the outlet of orifice 2, and plunger 3 being in its upward position to permit the flow of glass through the orifice.

In Fig. 2, mold 4 is shown as having received substantially a full charge 8 of glass, the charge having spread laterally from the central towards the marginal portion of the mold, and the stream of glass flowing in a straight line from the container to the mold. In this figure, plunger 3 is indicated as having been lowered to cause the glass to flow more rapidly through the orifice, and to also be in a position to later temporarily stop flow through the orifice. Substantially at the end of the charging operation, mold 4 is lowered to the position shown in Fig. 3 to neck the stream of glass, as indicated at 9, and plunger 3 has begun its upward movement which facilitates this necking and later interrupts flow through the orifice. In the last stage of the operation, which is shown in Fig. 4, mold 4 is moved laterally with relation to orifice 2 to facilitate the action of severing shears 10 in turning the tail of the glass to the side of the gathering.

While the invention has been specifically described with reference to a plunger controlled orifice of a forehearth and a press mold into which glass is charged, it is applicable to the flowing of glass from other glass containers and into other forms and types of molds, and to controlling the flow of glass otherwise than by a plunger. In extensive practice of the invention it has been found that articles of any desired weight and configuration may be readily formed of glass at any suitable temperature without the presence of seams and other defects which have heretofore characterized glassware formed from charges of glass delivered by flow feeders.

According to the provisions of the patent statutes, I have explained the principle and mode of operation of my invention, and have described the preferred manner of practicing it. However, I desire to have it understood that, within the scope of the appended claims, the invention may be practiced otherwise than as specifically described, and on apparatus other than that illustrated.

I claim as my invention:

1. The method of preventing the formation of laps and seams in a body of molten glass delivered from a container to a mold, comprising flowing the glass in a laterally unconfined stream from an orifice of the container upon and supported by the bottom of a mold, during the major portion of such flow maintaining the bottom of the mold and the discharge orifice of the container at a distance from each other not greater than about three times the diameter of the orifice, and severing the molten stream of glass.

2. The method of preventing the formation of laps and seams in a body of molten glass delivered from a container to a mold comprising flowing the glass in a laterally unconfined stream from an orifice of the container upon and supported by the bottom of a mold, during the major portion of such flow maintaining the bottom of the mold at a distance from the orifice of not more than about three times the diameter of the orifice, and severing the molten stream of glass.

3. The method of preventing the formation of laps and seams in a body of molten glass delivered from a container to a mold, comprising flowing the glass in a laterally unconfined stream from an orifice of the container upon and supported by the bottom of a mold, during the major portion of such flow maintaining the bottom of the mold and discharge orifice of the container at a distance from each other not greater than about three times the diameter of the orifice and increasing the distance between the orifice and the mold to neck the stream of glass prior to severing it.

4. The method of preventing the formation of laps and seams in a body of molten glass delivered from a container to a mold, comprising flowing the glass in a laterally unconfined stream from an orifice of the container upon and supported by the bottom of a mold, during the major portion of such flow maintaining the bottom of the mold at a distance from the orifice of not more than about three times the diameter of the orifice, and lowering the mold from the orifice to neck the stream of glass prior to severing it.

5. The method of preventing the formation of laps and seams in a body of molten glass delivered from a container to a mold, comprising flowing the glass in a laterally unconfined stream from the container upon and supported by the bottom of the mold, maintaining the bottom of the mold at such proximity to the discharge orifice of the container that the glass flows in a substantially straight line upon and spreads laterally from the central portion of the mold, and simultaneously lowering the mold from and moving it laterally of the orifice to neck the stream of glass prior to severing it.

In testimony whereof, I sign my name.

ROY E. SWAIN.